Patented June 12, 1951

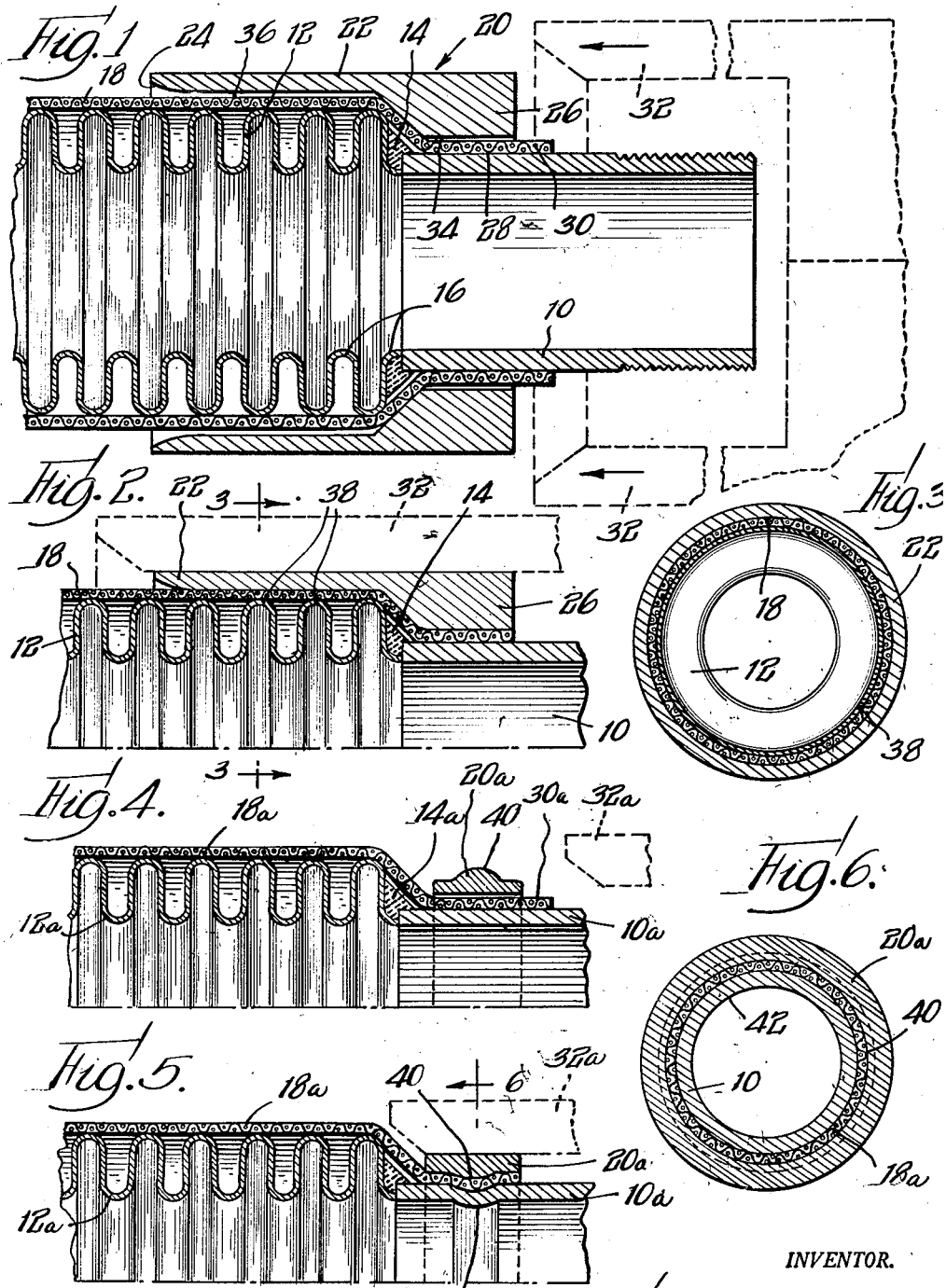

2,556,544

UNITED STATES PATENT OFFICE 2,556,544

COUPLING CONNECTION

Axel Fredrick Johnson, Lombard, Ill., assignor to Chicago Metal Hose Corporation, Maywood, Ill., a corporation of Illinois Application July 13, 1946, Serial No. 683,365

3 Claims. (Cl. 285—72)

1

This invention relates to coupling connections, and more particularly to coupling connections for use with sheathed flexible metal tubing.

When fluids are transmitted through flexible convoluted metal tubing under pressure, the fluid pressure tends to elongate or stretch the hose in an axial direction, as well as to subject the hose to radial or bursting pressure. To resist such axial elongation it is customary to encase the tubing within a braided sheathing, such for example as a metal wire braid.

It is also customary, in the use of flexible metal tubing, to provide coupling connections for the ends thereof, so as to adapt the hose for connection with other couplings, fittings or devices with which the tubing is to be associated.

It is desirable that the coupling connection include provisions for securing the coupling body both to the tubing and to the braid or sheathing, so as to provide a proper end assembly and firm anchorage.

In one form of coupling connection, heretofore employed for braided tubing, provision has been made for mechanically anchoring both the tubing end and the end of the braid by relatively shiftable parts having threaded interconnection for clamping purposes. A satisfactory interconnection can be made by this means, but frequently such structure has the objection that it is complex and costly.

In certain instances it is desirable that the tubing end be connected to the coupling fitting by heat sealing, so as to insure fluid-tightness, under all conditions of operation, even to the most searching of fluids under high pressure. Such heat sealing, however, has the disadvantage that it may anneal and thus weaken those convolutions of the tubing immediately juxtaposed to the heat sealed end. This annealing and weakening may take place to an indeterminate degree, and may become an unknown and bothersome factor in the structure in use, particularly when the end connection is subjected to severe operating conditions of pressure, bending, and other service conditions.

In accordance with the present invention an improved coupling connection is provided, for sheathed flexible convoluted hose of the type set forth, which is simple in construction, rugged in service, and which may be readily applied in the securing of the tubing and braid so as to facilitate the production of the coupling end connection.

More specifically stated, it is an object of the invention to provide a simplified, mechanically strong and fluid-tight coupling structure for flexible convoluted metal tubing, wherein the tubing end is secured to the coupling body by heat sealing, and the braid is secured by mechanical means.

A further object of the invention is to provide, in a coupling connection of the type defined, in one preferred embodiment thereof, means for reinforcing the tubing convolutions, in an improved manner, and as an incident to the formation of the coupling connection.

A still further object of the invention is to provide a coupling connection of the type defined wherein the braid securing or clamping member is positively interlocked with the coupling body in an improved and simplified manner, providing a firm braid end connection and reinforcing construction.

Various other objects, advantages and features of the invention will be apparent from the following specification, when taken in connection with the accompanying drawings, wherein certain preferred embodiments are set forth for purposes of illustration.

In the drawings, wherein like reference numerals refer to like parts throughout:

Fig. 1 is a longitudinal cross sectional view of a coupling connection constructed in accordance with and embodying the principles of the invention, in accordance with one preferred embodiment thereof, the parts being shown in the position occupied prior to the compression of the braid clamping collar or means;

Fig. 2 is a view of the parts shown in Fig. 1, after the compression of the braid clamping means;

Fig. 3 is a transverse sectional view of the structures shown in Figs. 1 and 2, on a reduced scale, and taken as indicated by the line 3—3 of Fig. 2;

Fig. 4 is a partial longitudinal sectional view of a coupling connection of the invention, in a modified embodiment thereof, the parts being shown in the position occupied prior to the radial compression of the braid clamping member;

Fig. 5 is a view similar to Fig. 4 showing the parts after the compression of the braid clamping member or means; and Fig. 6 is a reduced scale transverse sectional view of the coupling structure of Figs. 4 and 5, taken as indicated by the line 6—6 of Fig. 5.

Referring more specifically to the drawings, and first to the embodiment illustrated in Figs. 1–3, in Fig. 1 there is illustrated a coupling structure for tubing of the convoluted flexible type, comprising a coupling body 10 adapted for end connection with the tubing 12 by means of heat sealing as indicated at 14. Various means of effecting the heat sealing may be employed, such as by brazing or soldering, as indicated, or by welding.

The heat sealed end connection provides a connection between the tubing end and the coupling body of insured fluid-tightness, and of sufficient rigidness for most installations. However, difficulty in controlling the application of the heat, both as to quantity and location, may result in the annealing and weakening of the convolutions juxtaposed to the tubing end, such as indicated at 16, to an indeterminate and uncontrolled degree.

As shown in Fig. 1, the tubing is provided with a braid or sheathing 18, for the purposes hereinbefore set forth which, in the embodiment illustrated, may for example comprise a metal wire braid.

In accordance with the invention, coupling means is provided which is effectively operable, and readily applied, to connect the end of the braid firmly to the coupling body; and in the embodiment illustrated in Figs. 1-3, also to reinforce and protect the tubing and connection between the tubing and coupling body. More specifically, there is provided a braid clamping collar 20 having a relatively extended cylinder portion 22 terminating in a bell mouth 24; and a thickened portion as indicated at 26, the inner bore of which is of reduced diameter in respect to the portion 22.

In fabricating the coupling assembly, the clamping collar is arranged about the assembly after the brazed connection has been made, as indicated at 14, and after the end of the braid 18 has been drawn down onto the end surface of the coupling body for a predetermined distance, as indicated at 28. Preferably the braid is of sufficient length so that it extends somewhat beyond the collar portion 26, as indicated at 30, Fig. 1. The dimensions of the clamping collar 20 are such that it can be readily slipped into position as shown.

A split die, diagrammatically indicated at 32, Fig. 1, is then projected axially of the clamping collar, as indicated in Fig. 2, so as to compress the collar radially inwardly into tight gripping engagement with the braid. It will be noted that prior to the compressing operation the space between the braid and collar outwardly of the coupling body, as indicated at 34, Fig. 1, is less than the space between the braid and collar outwardly of the tubing, as indicated at 36. Accordingly as the collar compression is effected the braid is tightly clamped between the collar and coupling body, to provide a firm mechanical grip, whereas the braid is more lightly clamped onto the crest portions of the tubing, as indicated at 38, Fig. 2, so that the tubing convolutions are not materially distorted or otherwise deviated from their normal contours. By this means the tubing convolutions are free to perform their normal flexing functions after the coupling connection has been formed, within the limits permitted by the collar portion 22.

After the clamping operations have been effected, the extending end 30 of the braid is preferably trimmed off by a lathe tool, or other suitable means, so that in the final assembly the end of the braid lies flush with the end face of the collar 26, as shown in Fig. 2.

Preferably the end of the tubing is severed at substantially the midpoint of its trough portion, thus in effect forming a cup or reservoir into which the brazing or soldering material 14 may be formed, thus increasing the contact area between the brazing material and the tubing, and between the brazing material and the coupling body, to provide a fluid-tight and mechanically secure connection. The strength of the connection is then further reinforced by the clamping collar 20 which draws the braid tightly down into position, and clamps it, and also by its portion 22 encompasses the tubing convolutions to limit their flexing movements. The collar portion 22 thus reduces the flexing stresses transmitted to the brazed tubing connection, and also protects the possibly annealed and weakened convolutions 16 by limiting their flexing movements as the structure is subjected to use. Still further, the bell mouth 24 prevents the application of localized stresses to the tubing at the end of the clamping collar. The flexing stresses are thus, by the arrangement provided, distributed over a relatively wide area of the tubing, and are applied to those tubing convolutions which possess both their original shape and metallurgical composition, for proper functioning.

While in the preferred embodiment disclosed, heat sealing is employed for interconnecting the tubing end and the coupling body, in certain instances mechanical clamping means may be preferred. Similarly, while the connection finds particular utility for use with annularly convoluted tubing, which facilitates the production of the brazed connection 14, the arrangements provided are also well adapted for use with helically convoluted tubing.

While the means shown in Figs. 1-3 provides a firm mechanical grip for the braid end, in certain instances a more positive mechanical interlock, for greater strength, may be desired. Also, in certain instances the reinforcement of the end tubing convolutions by the clamping collar may not be required due to the character of use. Such an arrangement is shown in Figs. 4-6.

In this instance the braid clamping collar, as indicated at 20a, which corresponds functionally to the clamping collar 20 previously described, is provided with an annular protuberance or thickened portion as indicated at 40. Also, the extending cylinder flange portion of the collar, such as indicated at 22 in the embodiment previously described, is omitted.

In forming the coupling connections of Figs. 4-6, the axially movable die member 32a is projected over the braid clamping member, as before, whereupon the clamping member or collar is compressed into firm mechanical gripping engagement with the braid. Also, in the arrangement of Figs. 4-6, as the compression of the collar is effected, it will be seen that the enlarged or projected portion 40 of the clamping member will be shifted from an annularly outwardly projected position to an annularly inwardly projected position, as shown in Fig. 5. Simultaneously an annularly inwardly projected ridge will be formed into the coupling body, as indicated at 42, the braid being clamped between the ridges of the clamping member and coupling to provide in effect a mechanical interlock firmly anchoring the braid into position.

The braid end, as indicated at 30a, may be trimmed off as before.

It will be seen that by reason of the structures disclosed a simplified construction is provided, which may be readily applied, and which provides a firm and fluid-tight anchorage for the tubing end, and a firm anchorage for the braid so as to cause it to perform its intended functions. The clamping member for the braid can, if desired, and as has been set forth, serve also as a reinforcing means for the tubing and its coupling connection; and where desired, may also provide a positive interlock with the coupling body, as for example in installations wherein the braid may be subjected to extreme axial tension.

It is obvious that various changes may be made in the specific embodiments set forth without departing from the spirit of the invention. The invention is accordingly not to be limited to the specific embodiments shown, but only as indicated in the following claims.

The invention is hereby claimed as follows:

1. In a coupling connection, a flexible metal hose, a metallic coupling member sealed to one end of said hose in fluid-tight relation, a sheathing encasing said hose and extending over a portion of said coupling member, and a ring of malleable metal encompassing the portion of said sheathing extending over said coupling member, said ring having an inwardly extending circumferential rib lockingly engaging a groove compressed thereby in said coupling member, the sheathing being interlocked between said rib and groove.

2. In a coupling connection, a cylindrical metallic coupling member and a convoluted flexible metal tubing disposed in longitudinally extending relation, a band of metal fused to abutting ends of said member and tubing to seal the same in fluid-tight relation, a sheathing encasing said tubing and extending over a portion of said coupling member, and a ring encompassing the portion of said sheathing which extends over said coupling member, said ring having an inwardly extending circumferential rib lockingly engaging a groove in said coupling member formed by radial compression of a circumferential rib provided on said ring, the sheathing being interlocked between said rib and groove.

3. In a hose coupling, a coupling member, a convoluted flexible metal hose having the end thereof adjacent said coupling member relatively positioned with respect to the end of said coupling member to provide an open annular pocket between the coupling member and the adjacent surface portion of the hose, a band of metal filling said pocket and fused to the end of said coupling member and the adjacent surface of the hose to provide a sealed fluid-tight connection, a sheathing encasing said hose and extending beyond the sealed end thereof and lying over an adjacent portion of said coupling member, and a clamping member including a sleeve portion projecting to a limited extent along and in light contact with the sheathing around the hose convolutions for reinforcing the hose convolutions in this area and further including an inwardly projecting ring portion radially compressed into tight clamping engagement with the extended end of the sheathing compressed between the said ring portion and said coupling member.

AXEL FREDRICK JOHNSON.

REFERENCES CITED

The following references are of record in the file of this patent:

UNITED STATES PATENTS

| Number | Name | Date |
| --- | --- | --- |
| 2,146,756 | Miller | Feb. 14, 1939 |
| 2,216,468 | Farrar | Oct. 1, 1940 |
| 2,300,547 | Guarnaschelli | Nov. 3, 1942 |
| 2,310,536 | Melsom | Feb. 9, 1943 |
| 2,351,416 | Fentress | June 13, 1944 |